United States Patent
Nagasaka et al.

(10) Patent No.: US 9,916,752 B2
(45) Date of Patent: Mar. 13, 2018

(54) MULTIPLEXING COMMUNICATION SYSTEM AND WORKING ROBOT

(71) Applicant: FUJI MACHINE MFG. CO., LTD., Chiryu (JP)

(72) Inventors: Nobuo Nagasaka, Okazaki (JP); Yasuaki Imadera, Chiryu (JP); Naomichi Ishiura, Okazaki (JP); Shigemoto Hirota, Nagoya (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 141 days.

(21) Appl. No.: 15/028,130

(22) PCT Filed: Oct. 9, 2013

(86) PCT No.: PCT/JP2013/077444
§ 371 (c)(1),
(2) Date: Apr. 8, 2016

(87) PCT Pub. No.: WO2015/052790
PCT Pub. Date: Apr. 16, 2015

(65) Prior Publication Data
US 2016/0240077 A1    Aug. 18, 2016

(51) Int. Cl.
*H04J 3/02* (2006.01)
*G08C 15/00* (2006.01)
(Continued)

(52) U.S. Cl.
CPC ......... *G08C 15/00* (2013.01); *G05B 19/0423* (2013.01); *H04J 3/1682* (2013.01);
(Continued)

(58) Field of Classification Search
None
See application file for complete search history.

(56) References Cited

U.S. PATENT DOCUMENTS 7,082,144 B1    7/2006  Grutter
2001/0040324 A1*  11/2001  Mayama ............... F16F 15/02
                                                                267/136
(Continued)

FOREIGN PATENT DOCUMENTS

JP      8-233599 A    9/1996
JP      3186490 B2    7/2001
(Continued)

OTHER PUBLICATIONS

Extended European Search Report dated May 18, 2017 in Patent Application No. 13895279.1.
(Continued)

*Primary Examiner* — Otis L Thompson, Jr.
(74) *Attorney, Agent, or Firm* — Oblon, McClelland, Maier & Neustadt, L.L.P.

(57) ABSTRACT

A multiplexing communication system is capable of maintaining an appropriate response speed of a control with respect to an electromagnetic motor based on an encoder signal during multiplexing and transmission of the encoder signal. A transmission data composition processing section of a multiplex communication device multiplexes encoder signals ENCD1 to ENCD8 output from a linear scale and a rotary encoder into frame data FRMD and transmits the data. The transmission data composition processing section sets the encoder signals ENCD1 to ENCD8 to bit positions of the frame data FRMD respectively corresponding to the linear scale and the rotary encoder. At the bit positions where the encoder signals ENCD1 to ENCD8 are set, the encoder signal ENCD and information showing the presence or absence of the data of the encoder signal ENCD are alternately set for each cycle of transmission of the frame data FRMD.

10 Claims, 9 Drawing Sheets

(51) Int. Cl.
*H04L 5/00* (2006.01)
*H04L 5/16* (2006.01)
*H04L 29/06* (2006.01)
*G05B 19/042* (2006.01)
*H04J 3/16* (2006.01)
*G01D 5/245* (2006.01)

(52) U.S. Cl.
CPC .............. *H04L 5/0046* (2013.01); *H04L 5/16* (2013.01); *H04L 69/08* (2013.01); *G01D 5/245* (2013.01); *G08C 2200/00* (2013.01)

(56) References Cited

U.S. PATENT DOCUMENTS

| | | | |
|---|---|---|---|
| 2006/0045679 A1* | 3/2006 | Ostendorff | B25J 5/007 414/402 |
| 2010/0228264 A1* | 9/2010 | Robinson | A61B 18/1206 606/130 |
| 2010/0278086 A1* | 11/2010 | Pochiraju | H04W 28/20 370/310 |
| 2017/0100839 A1* | 4/2017 | Kai | B23Q 1/035 |
| 2017/0165838 A1* | 6/2017 | Sato | B25J 9/1694 |

FOREIGN PATENT DOCUMENTS

| | | |
|---|---|---|
| WO | WO 00/27060 A1 | 5/2000 |
| WO | WO 2013/084327 A1 | 6/2013 |

OTHER PUBLICATIONS

International Search Report dated Nov. 12, 2013 in PCT/JP2013/077444 filed Oct. 9, 2013.

* cited by examiner

[FIG. 1]
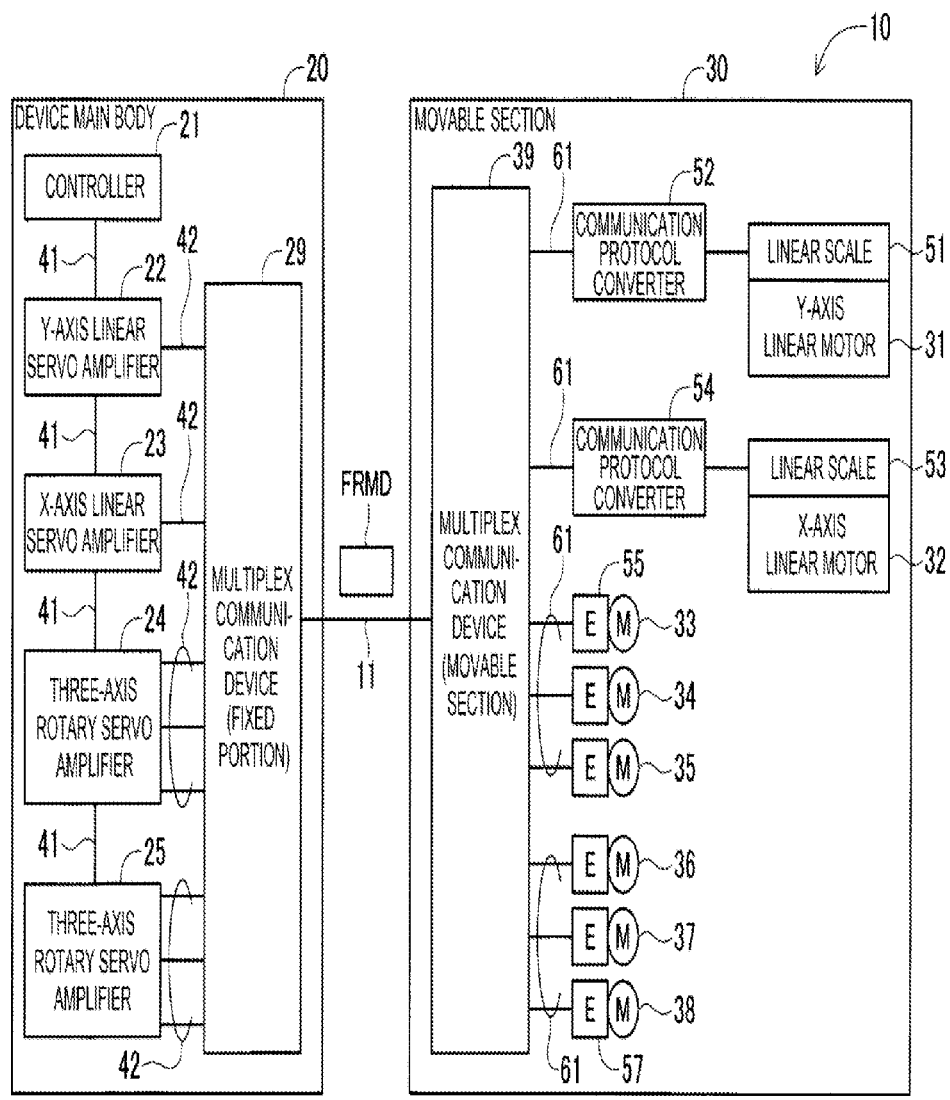

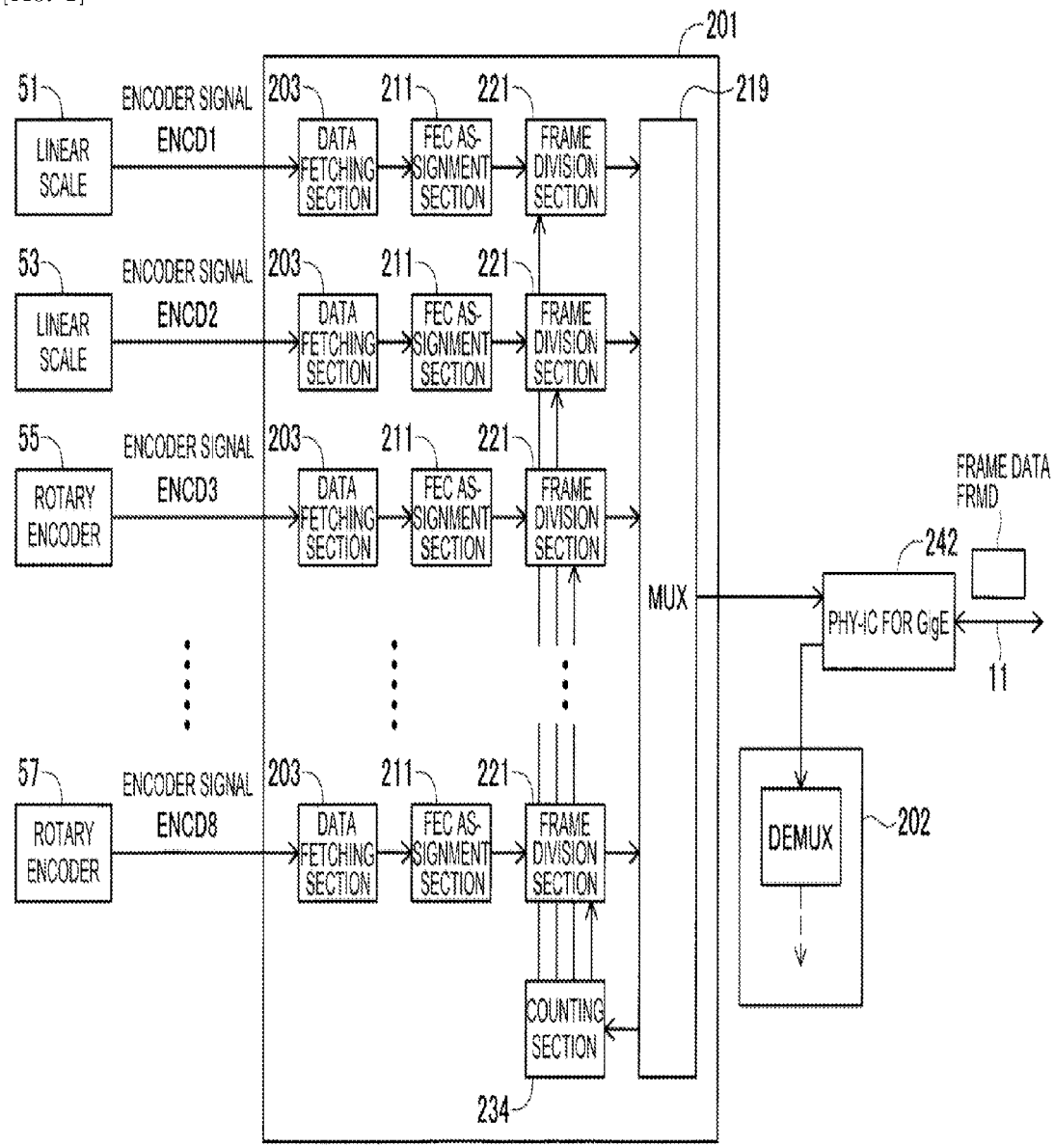
[FIG. 2]

[FIG. 3]
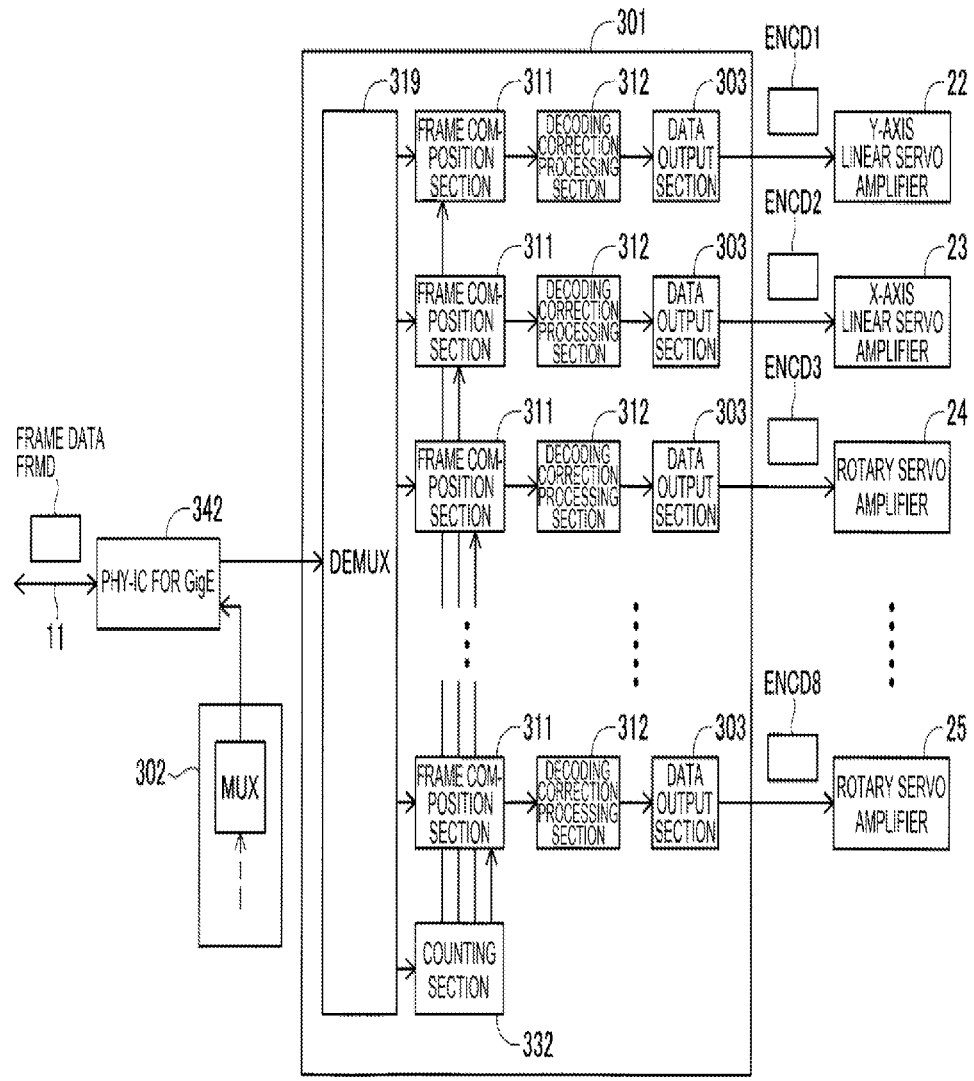

[FIG. 4]
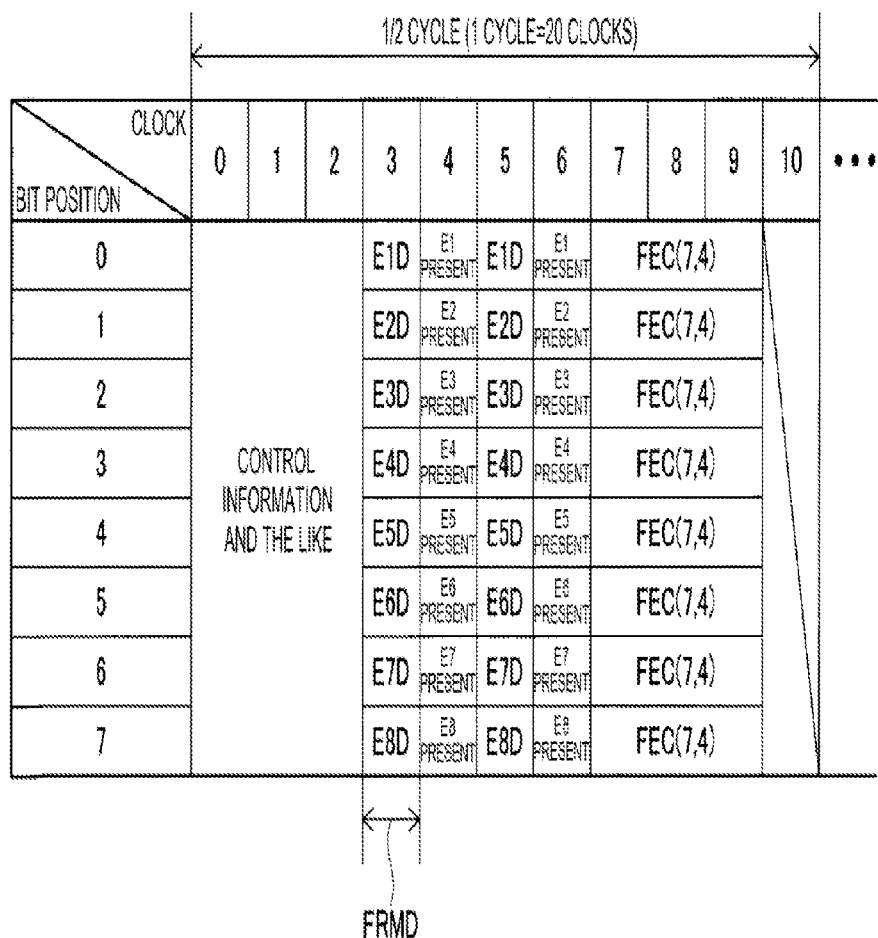

[FIG. 5]
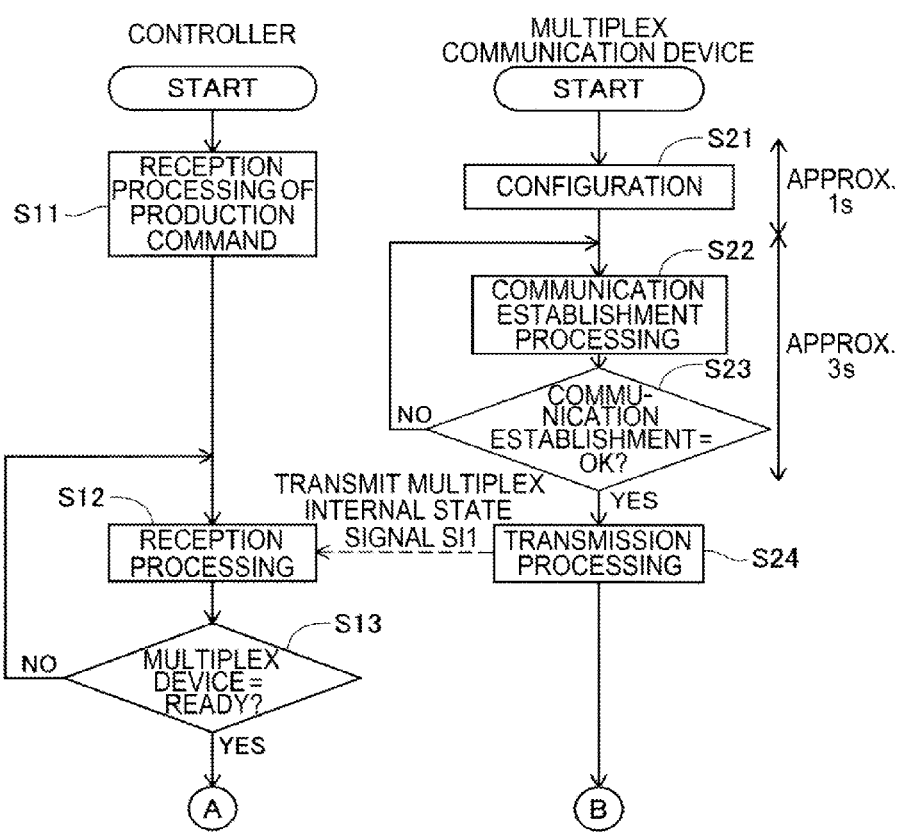

[FIG. 6]
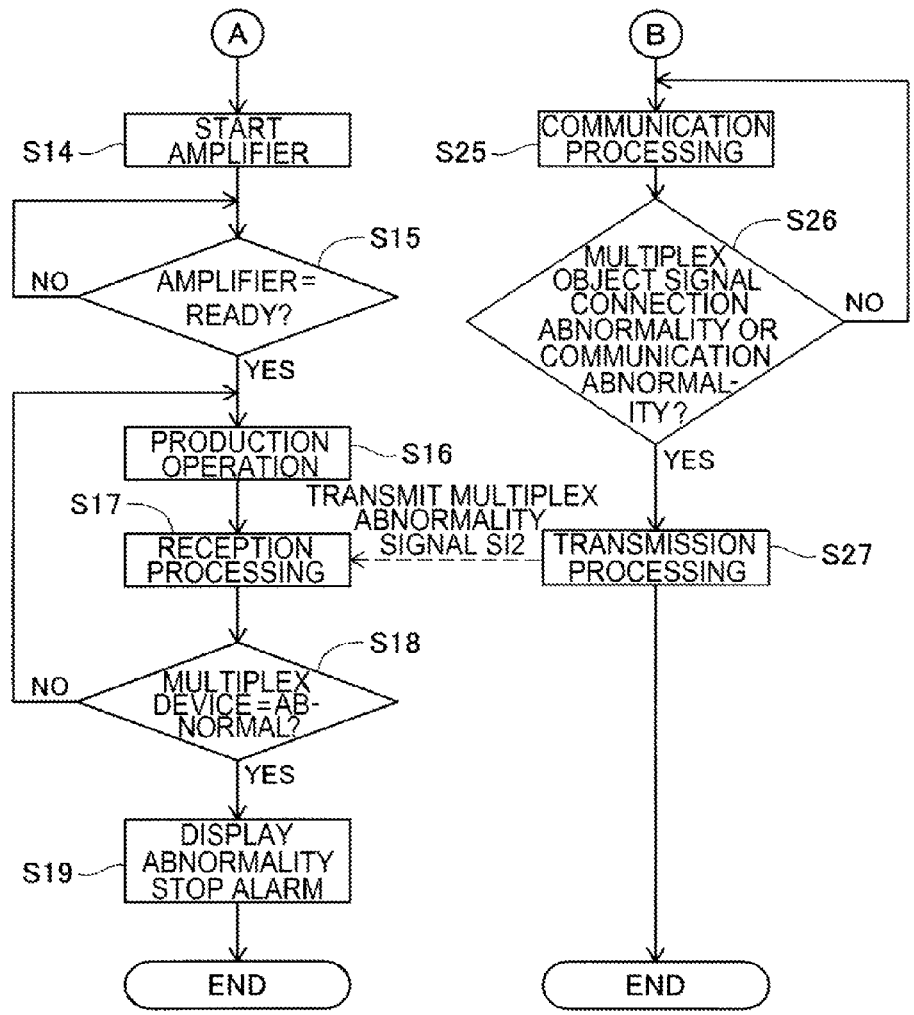

[FIG. 7]
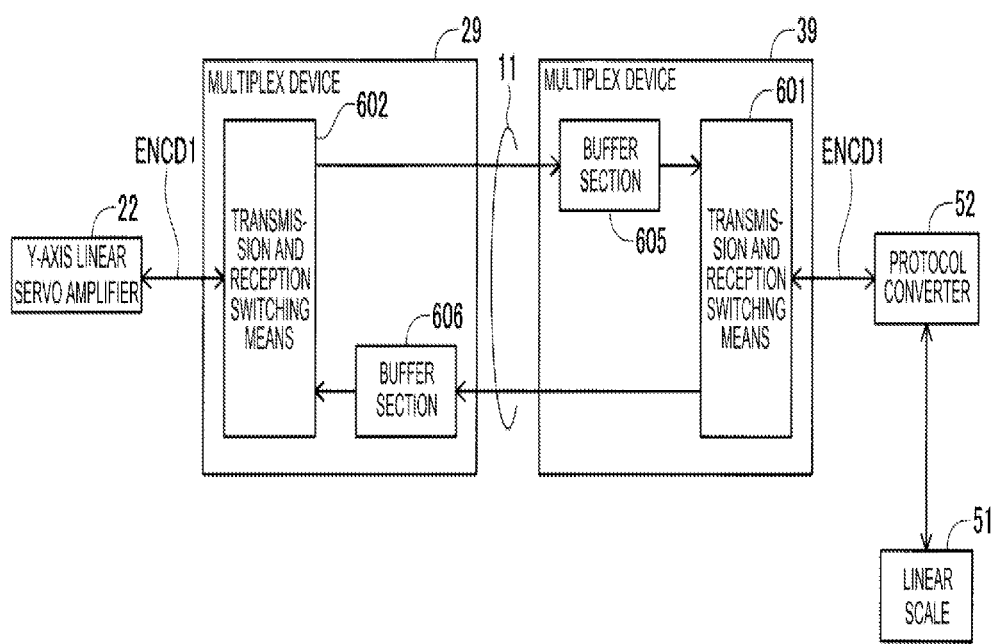

[FIG. 8]
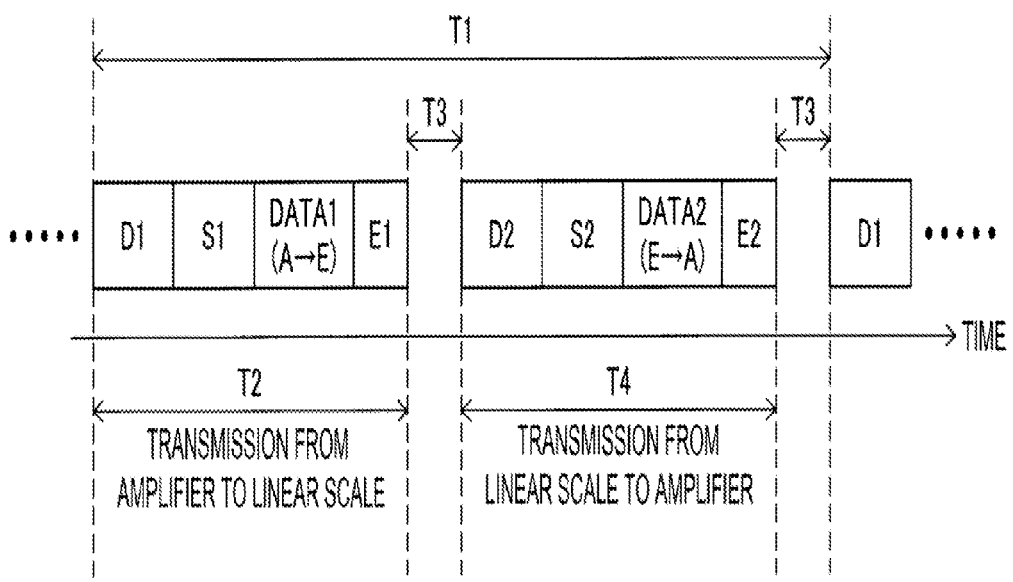

[FIG. 9]

| BIT POSITION \ CLOCK | 0 | 1 | 2 | 3 | 4 | 5 | 6 | 7 | 8 | 9 | 10 | ... |
|---|---|---|---|---|---|---|---|---|---|---|---|---|
| 0 | | | | E1D | E1N | E1Z | E1 PRESENT | FEC(7,4) | | | | |
| 1 | | | | E2D | E2N | E2Z | E2 PRESENT | FEC(7,4) | | | | |
| 2 | | | | E3D | E3N | E3Z | E3 PRESENT | FEC(7,4) | | | | |
| 3 | CONTROL INFORMATION AND THE LIKE | | | E4D | E4N | E4Z | E4 PRESENT | FEC(7,4) | | | | |
| 4 | | | | E5D | E5N | E5Z | E5 PRESENT | FEC(7,4) | | | | |
| 5 | | | | E6D | E6N | E6Z | E6 PRESENT | FEC(7,4) | | | | |
| 6 | | | | E7D | E7N | E7Z | E7 PRESENT | FEC(7,4) | | | | |
| 7 | | | | E8D | E8N | E8Z | E8 PRESENT | FEC(7,4) | | | | |

1/2 CYCLE (1 CYCLE=20 CLOCKS)

FRMD

MULTIPLEXING COMMUNICATION SYSTEM AND WORKING ROBOT

TECHNICAL FIELD

The present disclosure relates to a multiplexing communication system and a working robot that transmits data related to an operation by using the multiplexing communication system.

BACKGROUND ART

In a working robot such as an electronic component mounting apparatus according to the related art, for example, electromagnetic motors are built into a mounting head as driving sources that change the position, orientation, and the like of a suction nozzle which picks up an electronic component. In the working robot, an amplification section is disposed on a device main body side for drive control of the electromagnetic motors based on encoder signals that are output from encoders which detect displacement and the like of the electromagnetic motors. In this type of working robot, a larger number of electromagnetic motors are required to be built into the mounting head so that the suction nozzle is moved accurately in a larger number of directions. However, in the working robot, an increase in the number of devices, that is electromagnetic motors and encoders, mounted on the mounting head leads to an increase in the number of communication lines connecting the amplification section to the encoders and the like; this leads to problems such as an increase in space required for wiring and a higher possibility of communication line disconnection. In this regard, multiplexing communication systems are in use that multiplex the encoder signals and transmit the encoder signals via a common communication line so as to reduce the number of communication lines for the amplification section and the encoders (for example, PTL 1).

CITATION LIST

Patent Literature

PTL 1: Japanese Patent No. 3186490

BRIEF SUMMARY

Problem to be Solved

In a case where multiple encoders are required to transmit encoder signals, the multiplexing communication system that is disclosed in PTL 1 transmits the encoder signals to a common communication line in order based on identification information set in advance. In this multiplexing communication system, however, in cases in which the quantity of electromagnetic motors increases or the bit quantity of the encoder signals increases due to encoder resolution enhancement, one cycle in which multiple encoder signals are multiplexed and transmitted in order lengthens. As a result, the amplification section has reduced control performance, with a delay occurring in the response speed of feedback control with respect to the electromagnetic motor based on the encoder signal for encoders further back in the order of transmission. Accordingly, a multiplexing communication system that is capable of maintaining response speed even when a high-resolution encoder is loaded, and even when the number of electromagnetic motor devices is increased, is desirable.

The present disclosure has been made in view of the above-described circumstances, and an object thereof is to provide a multiplexing communication system and a working robot in which control response speed with respect to an electromagnetic motor based on an encoder signal can be appropriately maintained when multiplexing and transmitting encoder signals.

Means for Solving the Problem

A multiplexing communication system according to a technique disclosed in the present disclosure in view of the above-described object includes a multiplexing device for transmitting a multiplex data string, the multiplex data string being a multiplexed encoder signal output from an encoder detecting the displacement of multiple electromagnetic motors, and a bit allocating device for bit-allocating the encoder signal and information related to the presence or absence of data of the encoder signal to each of bits bit-allocated in accordance with the encoder with respect to the multiplex data string of the transmission quantity of a pre-set timing among multiple of the bits included in the multiplex data string among multiple transmission quantities of the multiplex data string.

In addition, a working robot according to a technique disclosed in the present disclosure in view of the above-described object is a working robot that performs an operation by holding a work with a movable section and performs transmission of data related to the operation by using a multiplexing communication system. This multiplexing communication system includes a multiplexing device for transmitting a multiplex data string, the multiplex data string being a multiplexed encoder signal output from an encoder detecting the displacement of multiple electromagnetic motors, and a bit allocation device for bit-allocating the encoder signal and information related to the presence or absence of data of the encoder signal to each of bits bit-allocated in accordance with the encoder with respect to the multiplex data string of the transmission quantities of a pre-set timing among multiple of the bits included in the multiplex data string among multiple transmission quantities of the multiplex data string.

Effects

According to the technique disclosed in the present disclosure, the encoder signal is transmitted after being multiplexed, and thus a multiplexing communication system and a working robot capable of maintaining an appropriate response speed of a control with respect to an electromagnetic motor based on an encoder signal can be provided.

BRIEF DESCRIPTION OF DRAWINGS

FIG. 1 is a schematic diagram for showing a working robot according to this embodiment.

FIG. 2 is a block diagram illustrating a transmission data composition processing section of a multiplex communication device.

FIG. 3 is a block diagram illustrating a reception data demultiplexing processing section of the multiplex communication device.

FIG. 4 is a diagram illustrating a configuration of frame data as a multiplex data string transmitted in the multiplexing communication system and the relationship to transmission data.

FIG. 5 is a flowchart illustrating processing content subsequent to starting of a controller and the multiplex communication device.

FIG. 6 is a flowchart illustrating the processing content subsequent to starting of the controller and the multiplex communication device.

FIG. 7 is a schematic diagram for showing communication between an amplifier and a linear scale.

FIG. 8 is a drawing illustrating the structure of data transmitted between the amplifier and the linear scale.

FIG. 9 is a diagram illustrating a configuration of frame data as a multiplex data string transmitted in a multiplexing communication system according to another embodiment and the relationship to transmission data.

DESCRIPTION OF EMBODIMENTS

Hereinafter, an embodiment of the present disclosure will be described with reference to accompanying drawings. Firstly, a working robot will be described as an example of a device to which a communication system according to the present disclosure is applied.
(Configuration of Working Robot 10)

FIG. 1 is a schematic diagram illustrating a configuration of a multiplexing communication system that is applied to working robot 10. As illustrated in FIG. 1, working robot 10 is provided with device main body 20 that is fixedly disposed in a place where working robot 10 is installed and movable section 30 that moves relative to device main body 20. Device main body 20 is provided with controller 21, Y-axis linear servo amplifier 22, X-axis linear servo amplifier 23, and three-axis rotary servo amplifiers 24 and 25. Movable section 30 is provided with Y-axis linear motor 31, X-axis linear motor 32, and six rotary-type servo motors 33 to 38.

Movable section 30 is provided with a robot arm that is driven to be displaced with a degree of freedom in each of, for example, X-axis, Y-axis, and Z-axis directions in response to driving of the respective motors 31 to 38. Working robot 10 is a working robot that carries out an operation such as mounting of a work held by movable section 30 (robot arm) for an object conveyed on a production line or the like based on control by controller 21. Controller 21 is configured to have, as a main component, a computer that is provided with a CPU, RAM, and the like. Controller 21 is connected to respective slave circuits (not illustrated) of amplifiers 22 to 25 by field network cable 41. Herein, the field network (control network) is, for example, MECHATROLINK (registered trademark)-III, in which controller 21 is a master, a network for data transmission and reception to and from amplifiers 22 to 25 connected to the slave circuits is built, and wiring integration (reduction) and the like are realized for a reduction in network construction cost.

Each of the amplifiers 22 to 25 is connected to multiplex communication device 29 by encoder cable 42. In working robot 10, multiplex communication device 29 that is disposed in device main body 20 is connected to multiplex communication device 39 that is disposed in movable section 30 by multiplex communication cable 11. Multiplex communication cable 11 is, for example, a LAN cable that is in compliance with communication standards of Gigabit Ethernet (registered trademark) or a USB cable that is in compliance with communication standards of Universal Serial Bus (USB) 3.0. Working robot 10 multiplexes respective encoder signals of motors 33 to 38 disposed in movable section 30 into frame data FRMD with multiplex communication device 39 and transmits the frame data FRMD to multiplex communication device 29 through multiplex communication cable 11. Multiplex communication device 29 demultiplexes the received frame data FRMD and transmits the demultiplexed frame data FRMD to amplifiers 22 to 25 corresponding to the individual encoder signals.

Controller 21 controls each of the motors 31 to 38 of movable section 30 via amplifiers 22 to 25. Y-axis linear servo amplifier 22 corresponds to Y-axis linear motor 31 of movable section 30. Linear scale 51, which detects the position of the movable section 30 (robot arm) moving on a guide rail along the Y-axis direction in response to the driving of Y-axis linear motor 31, is provided in movable section 30. Linear scale 51 outputs, to communication protocol converter 52, an encoder signal such as the position of movable section 30 in the Y-axis direction (Y coordinate value). Communication protocol converter 52 is connected to multiplex communication device 39 by encoder cable 61. Communication protocol converter 52 transmits the encoder signal of linear scale 51 to Y-axis linear servo amplifier 22 via multiplex communication devices 29 and 39. Y-axis linear servo amplifier 22 transmits the transmitted encoder signal to controller 21 via field network cable 41. Controller 21 controls Y-axis linear motor 31 via Y-axis linear servo amplifier 22 based on the encoder signal of linear scale 51. The robot arm is driven in, for example, the Y-axis direction by the driving of Y-axis linear motor 31 of movable section 30.

Likewise, X-axis linear servo amplifier 23 corresponds to X-axis linear motor 32 of movable section 30. Linear scale 53, which detects the position of movable section 30 moving on a guide rail along the X-axis direction in response to the driving of X-axis linear motor 32, is provided in movable section 30. An encoder signal of linear scale 53 is output to multiplex communication device 39 via communication protocol converter 54. Controller 21 controls X-axis linear motor 32 via X-axis linear servo amplifier 23 based on the encoder signal of linear scale 53.

Rotary-type servo motors 33 to 35 (hereinafter, referred to as "servo motors" in some cases) constitute three output shafts and drive, for example, a work-holding hand of the robot arm in each of the X-axis, Y-axis, and Z-axis directions, a direction of rotation, or the like. Servo motors 36 to 38 are similar in configuration to servo motors 33 to 35, and thus description thereof will be appropriately omitted herein. Rotary encoders 55 that are disposed in the respective servo motors 33 to 35 output encoder signals such as positional information of the respective servo motors 33 to 35 to multiplex communication device 39 via encoder cable 61. Three-axis rotary servo amplifier (hereinafter, referred to as a "servo amplifier" in some cases) 24 drives each of the servo motors 33 to 35 based on the encoder signals transmitted via multiplex communication devices 29 and 39. For example, servo motor 33 is a servo motor that is driven by a three-phase AC and has each of U-phase, V-phase, and W-phase coils; the coil of each phase of servo motor 33 is connected to servo amplifier 24 via a power line (not illustrated). Servo motor 33 is driven in response to the three-phase AC that is supplied through the power line from servo amplifier 24. Likewise, each of the other servo motors 34 and 35 is driven in response to the three-phase AC that is supplied through the power line from servo amplifier 24. Rotary encoders 57 that are disposed in the respective servo motors 36 to 38 output the encoder signals of the respective servo motors 36 to 38 to multiplex communication device 39 via encoder cable 61. Servo amplifier 25 drives each of the servo motors 36 to 38 based on the encoder signals transmitted via multiplex communication devices 29 and 39.

Hereinafter, error checking processing with respect to the encoder signal that is transmitted by the multiplexing communication system will be described. In the following description, a case where multiplex communication device 39 is the transmission side and multiplex communication device 29 is the reception side will be described. In addition, the respective encoder signals of linear scales 51 and 53 and rotary encoders 55 and 57 that correspond to the eight motors 31 to 38 will be referred to as encoder signals ENCD1 to ENCD8 in the following description. FIG. 2 is a block diagram mainly illustrating a transmission part of multiplex communication device 39. FIG. 3 is a block diagram mainly illustrating a reception part of multiplex communication device 29. Transmission data composition processing section 201 of multiplex communication device 39 that is illustrated in FIG. 2 performs error correction code addition processing with respect to the encoder signals ENCD1 to ENCD8 output from the respective devices.

(Configuration of Transmission Data Composition Processing Section 201)

Encoder signal ENCD1 that is output via communication protocol converter 52 (refer to FIG. 1) from linear scale 51 is temporarily acquired by a data fetching section 203, and a Hamming code forward error correction code FEC (7, 4) is assigned by FEC assignment section 211. For example, data fetching section 203 detects start flag S1 and end flag E1 (refer to FIG. 8) and executes processing for acquiring required data DATA2 when reading the encoder signal ENCD1 from linear scale 51 (communication protocol converter 52) by communication in compliance with communication standards of a high level data link control procedure (HDLC). Frame division section 221 divides the FEC-given encoder signal ENCD1 in accordance with the frame data FRMD. Frame division section 221 outputs the divided encoder signal ENCD1 to multiplexing section 219 (MUX). Counting section 234 counts the number of times of transmission of the frame data FRMD by multiplexing section 219. Frame division section 221 performs processing for reading the next data from the FEC assignment section 211 in accordance with the counting value that is output from counting section 234. FEC assignment section 211 adds information showing the presence or absence of data (refer to FIG. 4) in accordance with the input of the encoder signal ENCD1, and then assigns the Hamming code forward error correction code FEC (7, 4). Processing regarding the encoder signals ENCD2 to ENCD8 that are output from the other devices (linear scale 53 and rotary encoders 55 and 57) is similar to that regarding the encoder signal ENCD1, and thus description thereof will be omitted herein.

(Configuration of Reception Data Demultiplexing Processing Section 301)

Multiplexing section 219 multiplexes the input encoder signals ENCD1 to ENCD8 in accordance with, for example, a certain period of time (time slot) assigned with respect to an input port. The data multiplexed by multiplexing section 219 is sent to the multiplex communication cable 11 as frame data FRMD via, for example, external terminal 242 which is in compliance with the communication standards of Gigabit Ethernet (registered trademark). Multiplex communication device 29 that is illustrated in FIG. 3 receives the frame data FRMD transmitted through multiplex communication cable 11 via external terminal 342. In reception data demultiplexing processing section 301 of multiplex communication device 29, the respective encoder signals ENCD1 to ENCD8 are separated from the frame data FRMD by demultiplexing section (DEMUX) 319. Reception data demultiplexing processing section 301 performs error detection/correction processing with respect to the respective separated encoder signals ENCD1 to ENCD8.

Concerning the encoder signal ENCD1, the encoder signal ENCD1 divided into multiple sets of frame data FRMD is composed by frame composition section 311. Counting section 332 counts the number of times of reception of the frame data FRMD by demultiplexing section 319. Frame composition section 311 composes the encoder signal ENCD1 in accordance with the counting value that is output from counting section 332 and outputs the result to decoding correction processing section 312. Decoding correction processing section 312 performs error detection in accordance with the Hamming code forward error correction code (FEC) with respect to the composed encoder signal ENCD1 and, if necessary, performs correction processing regarding of incorrect data values. The corrected encoder signal ENCD1 is temporarily stored in data output section 303 and is transmitted to Y-axis linear servo amplifier 22. Processing regarding the other encoder signals ENCD2 to ENCD8 is similar to that regarding the encoder signal ENCD1, and thus description thereof will be omitted herein. Reception data demultiplexing processing section 202 of multiplex communication device 39 that is illustrated in FIG. 2 is similar in configuration and operation to reception data demultiplexing processing section 301 described above, and thus description thereof will be omitted herein. Likewise, transmission data composition processing section 302 of multiplex communication device 29 that is illustrated in FIG. 3 is similar in configuration and operation to transmission data composition processing section 201 that is illustrated in FIG. 2, and thus description thereof will be omitted herein.

FIG. 4 shows data on each bit position of the frame data FRMD as a multiplex data string. The frame data FRMD is, for example, configured to have eight bits per frame. Multiplex communication devices 29 and 39 have a cycle per frame set to 8 nsec (frequency being 125 MHz) and build a communication line of 1 Gbps (eight bits×125 MHz). This communication line is half-duplex communication. FIG. 4 shows data transmitted for each clock for the transmission of the frame data FRMD (for example, 8 nsec). The transmission and reception of the frame data FRMD are switched every half cycle with 20 clocks being one cycle (1 cycle). FIG. 4 shows a half cycle (½ cycle) of 0 to 10 clocks. Accordingly, in the example that is illustrated in FIG. 4, transmission and reception are switched at the tenth clock with multiplex communication devices 29 and 39 in synchronization with each other.

Regarding the frame data FRMD, control information such as header information is set during the three clocks of the ½ cycle (10 clocks) preceding the transmission of encoder signals ENCD1 to ENCD8 (clocks 0 to 2 in the example illustrated). In addition, regarding the frame data FRMD, data related to the encoder signals ENCD1 to ENCD8 is set during six clocks (clocks 3 to 9 in the example illustrated) of the ½ cycle (10 clocks). Each bit from the leading bit (bit position 0) to bit position 7 of the frame data FRMD correspond to encoder signals ENCD1 to ENCD8 in this order. In the frame data FRMD, encoder signals ENCD1 to ENCD8 ("E1D to E8D" in the drawing) are bit-allocated at the respective bit positions of clocks 3 and 5. In the frame data FRMD, in addition, information showing the presence or absence of the data of the encoder signals ENCD1 to ENCD8 ("E1D present to E8D present" in the drawing) are bit-allocated at the respective bit positions of clocks 4 and 6.

The information showing the presence or absence of the data is, for example, information for showing whether encoder signals ENCD1 to ENCD8 with a low speed with respect to the data transfer rate of the frame data FRMD are set to the respective bit positions 0 to 7. Encoder signals ENCD1 to ENCD8 and the information showing the presence or absence of encoder signals ENCD1 to ENCD8 are alternately set in each cycle. In the frame data FRMD, in addition, 3-bit code bits added as correction code FEC (7, 4) are set in three clocks (clocks 7 to 9 in the example illustrated) of one cycle. Encoder signals ENCD1 to ENCD8 are transmitted to multiplexing section 219 after being divided in accordance with the bit width of the corresponding bit allocation of the frame data FRMD by frame division section 221. Then, multiplex communication devices 29 and 39 transmit the frame data FRMD to which the correction code FEC (7, 4) is set for three consecutive clocks, and then switch transmission and reception in synchronization with each other at the 10 clock. The configuration of the frame data FRMD that is illustrated in FIG. 4 is an example and can be appropriately changed. For example, although the configuration of the frame data FRMD that is illustrated in FIG. 4 shows an example of the case of a configuration of an encoder in which linear scales 51 and 53 and rotary encoders 55 and 57 transmit data such as positional information in a serial manner (serial transmission type), the data at the respective bit positions of the frame data FRMD may be changed in the case of a configuration of another type of encoder. The configuration of the frame data FRMD pertaining to a case where another type of encoder is used will be described later (refer to FIG. 9).

(Bit Allocation Means)

Working robot 10 may be configured such that only multiplex communication device 39 is disposed as a body separate from movable section 30 and the devices of movable section 30 other than multiplex communication device 39 (such as the robot arm) may be detachable from multiplex communication device 39 as separate bodies. In this case, it is preferable that transmission data composition processing section 201 of multiplex communication device 39 sets the bit position at which the encoder signal ENCD of the frame data FRMD is set with no input data (with no encoder signal ENCD input) as a non-processing object in accordance with the number of the inputs of the encoder signal ENCD (such as the number of connected encoders) input from the encoder of a different type of interchangeable robot arm (device of movable section 30 other than multiplex communication device 39). Specifically, as illustrated in FIG. 4, eight bit widths from 0 to 7 are set in the frame data FRMD as the bit positions corresponding to the encoder signal ENCD. For example, transmission data composition processing section 201 detects that the number of rotary encoders 57 built into movable section 30 is changed due to the robot arm (movable section 30), which is detachable from multiplex communication device 39, being exchanged. For example, transmission data composition processing section 201 sends a confirmation signal to the robot arm and detects, from the response, that the number of rotary encoders 57 is one, which external terminal is connected to rotary encoder 57, and the like. In addition, transmission data composition processing section 201 sets the data showing that the bit position is the non-processing object (for example, bit value being "0" at all times) to two (such as bit positions 6 and 7) of the three bits (bit positions 5 to 7) corresponding to the rotary encoder 57 of the frame data FRMD with no input data, that is, without connection to rotary encoder 57. With the above-described configuration, multiplex communication can be executed without a change in the configuration of the frame data FRMD or the like even in the case of exchange to a robot arm that has a smaller number of encoders (rotary-type servo motors 33 to 38).

(Establishment of Communication of Multiplexing Communication System and Communication Error Handling)

Hereinafter, establishment of communication during starting of the multiplexing communication system and error handling during communication will be described. Transmission data composition processing section 201 (refer to FIG. 2) as a transmission section of multiplex communication device 29 and reception data demultiplexing processing section 301 (refer to FIG. 3) as a reception section of multiplex communication device 29 are configured as circuit blocks of a programmable logic device such as a field programmable gate array (FPGA). For example, demultiplexing section 319 of reception data demultiplexing processing section 301 transmits, to controller 21, a signal that shows the establishment of communication and a communication error in multiplex communication cable 11.

Communication establishment processing and error handling during communication of the multiplexing communication system will be described with reference to the flowcharts that are illustrated in FIGS. 5 and 6. Firstly, controller 21 initiates processing (processing according to the flow on the left side in FIG. 5) upon working robot 10 being put into operation. For example, controller 21 receives a command for a production job from an overall control device (not illustrated) that is connected to a network of the production line (Step S11). Working robot 10 may be configured such that controller 21 is an independently-operating device which reads and processes the production job from a memory in working robot 10. Prior to the initiation of the production job, controller 21 initiates processing for receiving a multiplex internal state signal SI1 showing the establishment of multiplex communication from multiplex communication device 29 (Step S12). Controller 21 is in a stand-by state until the multiplex internal state signal SI1 is input from multiplex communication device 29 (Step S13: NO).

On the other hand, multiplex communication device 29, initiates processing (processing according to the flow on the right side in FIG. 5) upon working robot 10 being put into operation. Multiplex communication device 29 initiates processing for building the circuit blocks in the FPGA including transmission data composition processing section 201 and reception data demultiplexing processing section 301 by reading configuration data from a memory or the like of device main body 20 (Step S21). Once the configuration is completed, transmission data composition processing section 201 of multiplex communication device 29 transmits a confirmation signal for initiating processing for the construction of the communication line toward reception data demultiplexing processing section 301 of facing multiplex communication device 39 (Step S22). Multiplex communication device 29 executes the construction of the communication line by regularly transmitting the confirmation signal until a response signal is received from multiplex communication device 39 (Step S23: NO). Once demultiplexing section 319 of reception data demultiplexing processing section 301 receives the response signal from multiplex communication device 39 and the construction of the communication line is completed (Step S23: YES), multiplex communication device 29 transmits multiplex internal state signal SI1 showing the establishment of the communication toward controller 21 (Step S24). When multiplex internal state signal SI1 is received and the establishment of the communication line is detected (Step S13: YES), controller 21 puts amplifiers 22 to 25 into operation (Step S14 in FIG. 6). Controller 21 stops controlling amplifiers 22 to 25 until signals showing the completion of starting are inputted from all the amplifiers 22 to 25 (Step S15: NO). Once the completion of the start of amplifiers 22 to 25 is detected (Step S15: YES), controller 21 initiates production operation by movable section 30 while transmitting data in the multiplexing communication system via the established communication line (Step S16).

On the other hand, multiplex communication device 29, initiates data transmission to and from multiplex communication device 39 once the communication line is established (Step S25 in FIG. 6). Multiplex communication device 29 monitors for abnormalities (communication errors) of the communication line in operation. For example, multiplex communication device 29 determines communication errors by regularly transmitting a confirmation signal to multiplex communication device 39 and checking the response signal (Step S26: NO). In a case where a communication error is detected (Step S26: YES), multiplex communication device 29 transmits a multiplex abnormality signal SI2 to controller 21 (Step S27).

Also, in addition to communication errors on the communication line, multiplex communication devices 29 and 39 monitor connection to a device that outputs a multiplexing object signal. For example, multiplex communication device 29 regularly monitors for an abnormality in connection between controller 21 and amplifiers 22 to 25. In addition, for example, multiplex communication device 39 regularly monitors for an abnormality in connection to linear scale 51. Multiplex communication devices 29 and 39 detect connection abnormalities in the case of a lack of input from another device for a predetermined period of time and in the case of a lack of response with respect to a confirmation signal. Multiplex communication devices 29 and 39 transmit the multiplex abnormality signal SI2 to controller 21 upon detecting a connection abnormality (Step S27).

Upon operation being initiated by working robot 10, controller 21 monitors for the input of multiplex abnormality signal SI2 from multiplex communication device 29 (Step S17). Controller 21 continues to execute the production operation (Steps S16 and S17) in the event of no input of the multiplex abnormality signal SI2 (Step S18: NO). In addition, controller 21 stops amplifiers 22 to 25 and executes error handling such as alarm display once an multiplex abnormality signal SI2 is input from multiplex communication device 29 (Step S18: YES).

(Start Timing of Amplifiers 22 to 25)

Hereinafter, start timing of amplifiers 22 to 25 will be described. As described above, multiplex communication device 29 performs processing for building the circuit blocks in the FPGA including transmission data composition processing section 201 based on the configuration data upon working robot 10 being put into operation (refer to Step S21 in FIG. 5). In addition, once the configuration is completed, multiplex communication device 29 initiates the construction of the communication line with multiplex communication device 39 (Steps S22 and S23). Accordingly, working robot 10 requires a certain period of time for the preparation of the multiplexing communication system until a mounting operation is allowed to be initiated after working robot 10 is put into operation.

Further, amplifiers 22 to 25 are required to check the states of the facing devices (linear scale 51 and rotary encoder 55) upon startup. However, since it is difficult for the working robot 10 to transmit data for a certain period of time after the initiation of the operation as described above, communication for performing a state check from amplifiers 22 to 25 to linear scale 51 and the like is processed as an error when multiplex communication device 29 and amplifiers 22 to 25 are put into operation at the same time. In this regard, multiplex communication device 29 according to this embodiment achieves a start timing adjustment with amplifiers 22 to 25. Multiplex communication device 29 determines the establishment of the communication line in Step S23 (refer to FIG. 5). In addition, controller 21 sets amplifiers 22 to 25 not to be put into operation (Step S13) until reception of multiplex internal state signal SI1 transmitted based on the detection of the establishment of the communication line by multiplex communication device 29. Accordingly, amplifiers 22 to 25 initiate the communication with respect to the facing devices after the establishment of the communication line is ensured, and thus data transmission and reception can be appropriately performed without problems such as communication errors.

Controller 21 may also be set to start amplifiers 22 to 25 after the elapse of a delay time (hereinafter, referred to as a "start delay time"), the starting point of which is a point in time when operation of multiplex communication devices 29 and 39 is initiated, without performing the determination based on multiplex internal state signal SI1. As illustrated in FIG. 5, the configuration during the start in Step S21 requires, for example, approximately one second (1 s) until the completion of the construction of the circuit block. The processing for the establishment of communication in Step S22 requires, for example, approximately three seconds (3 s) until the establishment of the communication line. Accordingly, controller 21 appropriately performs the transmission and reception of encoder signals ENCD1 to ENCD8 between amplifiers 22 to 25 and the facing devices by putting amplifiers 22 to 25 into operation after the elapse of, for example, a start delay time of five seconds after the start. In addition, a confirmation of the elapse or non-elapse of the start delay time described above may be based on a notification from multiplex communication device 29 to controller 21 instead of being carried out by controller 21.

(Communication Between Amplifiers 22 and 23 and Linear Scales 51 and 53)

Hereinafter, communication between amplifiers 22 and 23 and linear scales 51 and 53 will be described. In the following description, communication between Y-axis linear servo amplifier 22 and linear scale 51 will be described as an example. As illustrated in FIG. 7, multiplex communication device 39 is connected to communication protocol converter 52 and linear scale 51 via transmission and reception switching means 601. In FIG. 7, illustration of the respective devices provided in multiplex communication devices 29 and 39 is omitted for ease of understanding. Linear scale 51 according to this embodiment performs the transmission and reception of encoder signal ENCD1 to and from amplifier 22 via communication protocol converter 52 by synchronous half-duplex communication. The synchronous communication is, for example, communication in compliance with the communication standards of the high level data link control procedure (HDLC) at a communication speed of 8 Mbps. In addition, this synchronous communication is data transmission using a Manchester code, which exhibits good noise resistance. In this case, the communication speed subsequent to Manchester encoding is 4 Mbps.

Linear scale 51 according to this embodiment performs communication with a communication protocol that is different from the communication protocol (such as the HDLC) which is processed by amplifier 22. Communication protocol converter 52 converts input and output data of linear scale 51 to input and output data of the synchronous communication in compliance with the HDLC and outputs the result to transmission and reception switching means 601. Transmission and reception switching means 601 switches half-duplex communication transmission and reception to and from the communication protocol converter 52. Likewise, transmission and reception switching means 602 that is provided in multiplex communication device 29 switches half-duplex communication transmission and reception on the communication line which is connected to amplifier 22. The transmission and reception switching means 601 and 602 are circuit blocks of the programmable logic device such as the FPGA.

FIG. 8 shows an example of the half-duplex communication between amplifier 22 and linear scale 51. Each of amplifier 22 and linear scale 51 carries out data transmission once during a cycle T1. The cycle T1 is, for example, 61 μs. In a cycle T2, amplifier 22 transmits data DATA1 (encoder signal ENCD1) toward linear scale 51. The cycle T2 is, for example, 30 μs. The amplifier 22 adds the start flag S1 to the head of data DATA1 and adds the end flag E1 to the end of data DATA1, and then outputs the result to transmission and reception switching means 602. The start flag S1 and the end flag E1 are any bit values, examples of which include 8-bit data of "01111110". In addition, amplifier 22 transmits dummy data D1 for synchronization establishment after termination of data transmission during the preceding cycle and before initiation of the next data DATA1 transmission. The dummy data D1 is, for example, a bit value of "1111 . . . " and is data in which successive bits have the same signal level (such as a high level). This transmission of the data DATA1 is performed after division into bit widths of the correlated bit positions of the frame data FRMD by multiplex communication device 29 (for example, frame division section 221).

In addition, linear scale 51 transmits data DATA2 (encoder signal ENCD1) toward amplifier 22 in a cycle T4 subsequent to the elapse of switching time T3 of the transmission and reception after the termination of cycle T2. Switching time T3 is, for example, one μs. Cycle T4 is, for example, 30 μs. The data that is output from linear scale 51 is converted to data DATA2 in compliance with the HDLC by the above-described communication protocol converter 52, and start flag S2 and end flag E2 are added thereto. The data that is converted by communication protocol converter 52 (such as the data DATA2) is transmitted toward multiplex communication device 29 through transmission and reception switching means 601 and is output to amplifier 22 from transmission and reception switching means 602 of the facing multiplex communication device 29. Before the transmission of data (such as data DATA2) is initiated after the elapse of switching time T3, transmission and reception switching means 602 transmits dummy data D2 for establishment of synchronization with amplifier 22.

During the above-described half-duplex communication, transmission and reception switching means 602 detects the initiation of the transmission with, for example, a bit fall in which the signal level changes from dummy data D1 to start flag S1 (bit value changing from "1" to "0"). In addition, transmission and reception switching means 602 detects the termination of the transmission with the number of times of the detection of the bit value "01111110" showing the end flags E1 and E2. For example, transmission and reception switching means 602 switches the transmission and reception of the communication with the amplifier 22 when the bit value "01111110" is detected once, that is, when end flag E1 is detected after the detection of the bit fall. In addition, transmission and reception switching means 602 switches the transmission and reception of the communication with amplifier 22 at a point in time when the bit value "01111110" is detected three times (end flags E1 and E2 and start flag S2), that is, at the point in time of end flag E2 after the detection of the bit fall. In this manner, transmission and reception switching means 602 can appropriately detect the timing of transmission and reception switching even during half-duplex communication with a data structure (communication standards) in which data DATA1 and data DATA2 have different bit widths. Transmission and reception switching means 601 performs processing similar to that performed by transmission and reception switching means 602 on input and output data of communication protocol converter 52, and thus can appropriately detect the timing of transmission and reception switching.

As illustrated in FIG. 7, multiplex communication device 39 is provided with buffer section 605 that stores data DATA1 of the synchronous communication from amplifier 22 on the reception side. Likewise, multiplex communication device 29 is provided with buffer section 606 that stores data DATA2 of the synchronous communication from linear scale 51 on the reception side. Buffer sections 605 and 606 are provided with, for example, first-in first-out (FIFO) storage areas. In the example that is illustrated in FIG. 8, each bit from start flag S1 to end flag E1 among the data transmitted from amplifier 22 to linear scale 51 in cycle T2 is required to be output from transmission and reception switching means 601 to communication protocol converter 52 (linear scale 51) in the reception side multiplex communication device 39 in a state where the synchronization is maintained. However, as illustrated in FIG. 4, encoder signal ENCD1 (data DATA1) is transmitted bit by bit at a specific bit position of the frame data FRMD in the assigned clock, and thus the transmission of the communication from amplifier 22 to linear scale 51 is not continuously performed. In other words, the data transmission from amplifier 22 to linear scale 51 is subjected to a delay time due to the multiplex communication of multiplex communication devices 29 and 39. Accordingly, the data transmission of amplifier 22 and linear scale 51 might be subjected to a synchronization deviation attributable to a data error incidence, jitter, or the like in addition to the above-described multiplex communication delay.

In this regard, buffer sections 605 and 606 temporarily storing encoder signal ENCD1 on the reception side are disposed in multiplex communication devices 29 and 39 according to this embodiment, and thus the construction of synchronous communication is allowed. For example, buffer section 605 is configured to store a pre-set data amount of encoder signal ENCD1, for example, encoder signal ENCD1 having a data amount of one bit width (equivalent to two bits after Manchester encoding) and then initiate transmission to transmission and reception switching means 601. The capacity of the storage area of buffer section 605 is set through a simulation based on the data transfer rate of the multiplex communication, a data output interval time of the output of data DATA1 of the synchronous communication, and the like. Buffer section 605 temporarily stores and outputs, to transmission and reception switching means 601, encoder signal ENCD1 that is transmitted from amplifier 22 and decoded, error-handled, and output by reception data demultiplexing processing section 301 (refer to FIG. 3). In this manner, encoder signal ENCD1 is transmitted in a state where the synchronization is maintained with the delay time attributable to the multiplex communication or the like being eliminated by buffer section 605 of transmission and reception switching means 601. Accordingly, multiplex communication device 39 allows synchronous communication between amplifier 22 and communication protocol converter 52 (linear scale 51), even in the event of a delay due to data transmission via multiplex communication, by encoder signal ENCD1 being stored in buffer section 605 and output from transmission and reception switching means 601 to communication protocol converter 52. Likewise, multiplex communication device 29 allows synchronous communication between amplifier 22 and communication protocol converter 52 by encoder signal ENCD1 from communication protocol converter 52 being stored in buffer section 606.

The following effects are achieved by this embodiment described in detail above.

<Effect 1> Multiplex communication device 39 that is provided in movable section 30 of working robot 10 is provided with transmission data composition processing section 201 (refer to FIG. 2) which multiplexes encoder signals ENCD1 to ENCD8 output from linear scales 51 and 53 and rotary encoders 55 and 57 into the frame data FRMD (multiplex data string) and transmits the data. Transmission data composition processing section 201 bit-allocates encoder signals ENCD1 to ENCD8 to the bit positions of the frame data FRMD respectively corresponding to linear scales 51 and 53 and rotary encoders 55 and 57. At the bit positions where encoder signals ENCD1 to ENCD8 are set, encoder signals ENCD1 to ENCD8 and the information showing the presence or absence of the data of encoder signals ENCD1 to ENCD8 are alternately set for each cycle of the transmission of the frame data FRMD. In this configuration, encoder signals ENCD1 to ENCD8 are transmitted at any bit position of a determined cycle. The cycle and bit position of the transmission of encoder signals ENCD1 to ENCD8 are changed in accordance with, for example, the priority of the data pertaining to the mounting operation such as the response speed and accuracy required with respect to feedback control toward motors 31 to 38 based on encoder signals ENCD1 to ENCD8. In addition, the cycle and bit position of the transmission of encoder signals ENCD1 to ENCD8 are changed in accordance with a condition of a communication means which can be loaded on working robot 10 such as the speed of communication between multiplex communication devices 29 and 39. In other words, working robot 10 according to this embodiment can appropriately change the cycle and bit position of the transmission of encoder signals ENCD1 to ENCD8 with respect to the multiplexed frame data FRMD. Accordingly, in this configuration, a multiplexing communication system can be built that is capable of maintaining an appropriate response speed for feedback control with respect to motors 31 to 38 based on encoder signals ENCD1 to ENCD8.

<Effect 2> The controller 21 does not put amplifiers 22 to 25 into operation until the reception of multiplex internal state signal SI1 that is transmitted with the establishment of the communication line detected by multiplex communication device 29 (refer to Step S13 in FIG. 5). Accordingly, amplifiers 22 to 25 initiate the communication such as an inquiry of the state with respect to the facing linear scale 51 or the like after the establishment of the communication line is ensured, and thus the data transmission and reception is appropriately initiated without problems arising in the form of, for example, impossibility of state checking during starting due to a communication error.

<Effect 3> Buffer section 605 (refer to FIG. 7) that temporarily stores encoder signal ENCD1 is disposed in multiplex communication device 39. Accordingly, multiplex communication device 39 is capable of synchronous communication with linear scale 51, even in the event of a delay or the like attributable to the data transmission of the multiplex communication, by encoder signal ENCD1 being output to transmission and reception switching means 601 after being stored in buffer section 605.

<Effect 4> During the half-duplex communication between amplifier 22 and linear scale 51 (communication protocol converter 52), transmission and reception switching means 601 (refer to FIG. 7) that is provided in multiplex communication device 39 detects the initiation of the transmission with the bit fall in which the signal level changes from dummy data D1 (refer to FIG. 8) to start flag S1. In addition, transmission and reception switching means 601 detects the termination of the transmission with the number of times of the detection of the bit value showing end flags E1 and E2 and start flag S2. Accordingly, transmission and reception switching means 601 can appropriately detect the timing of transmission and reception switching even during the half-duplex communication with a data structure (communication standards) in which data DATA1 and data DATA2 have different bit widths. In addition, the initiation of the transmission can be determined based on the bit fall alone without analysis, determination, or the like of the bit value of start flag S1 by transmission and reception switching means 601. Accordingly, transmission and reception switching means 601 can be realized in a small-scale processing circuit; for example, the manufacturing costs of multiplex communication device 39 can be reduced by being configured from an FPGA circuit block.

<Effect 5> Movable section 30 is provided with communication protocol converter 52. Communication protocol converter 52 converts the input and output data of linear scale performing the data transmission with communication protocol differing from communication protocol of amplifier 22 to input and output data suitable for the communication protocol of amplifier 22. Accordingly, movable section 30 can connect linear scale 51 with communication protocol differing from that of amplifier 22 to multiplex communication device 39.

Herein, amplifiers 22 to 25 are examples of a drive control section. Linear scales 51 and 53 and rotary encoders 55 and 57 are examples of an encoder. Frame division section 221 and multiplexing section 219 of transmission data composition processing sections 201 and 302 constitute the bit allocation means. The processing of multiplex communication device 29 that is illustrated in Step S24 of FIG. 5 constitutes a notifying means. Frame data FRMD is an example of the multiplex data string. Multiplexing section (MUX) 219 is an example of a multiplexing means. Demultiplexing section (DEMUX) 319 is an example of a restoring means. Communication protocol converter 52 is an example of a protocol conversion means.

The present disclosure is not limited to the above-described embodiment. It is a matter of course that the present disclosure can be improved and modified in various forms without departing from the scope of the present disclosure. For example, although the multiplex communication via multiplex communication cable 11 (LAN cable) in compliance with the communication standards of the Gigabit Ethernet (registered trademark) has been described as an example in this embodiment, the present disclosure is not limited thereto. The present disclosure can be similarly applied to multiplex communication via other types of wired communication (such as those using an optical fiber cable and a USB cable), and the present disclosure can be similarly applied to wireless communication instead of wired communication as well. In addition, the configuration of the bit position of the frame data FRMD and the type of the data multiplexed into the frame data FRMD (sensor signals other than encoder signals ENCD1 to ENCD8 or the like) may be appropriately changed. For example, although working robot 10 according to the above-described embodiment multiplexes encoder signals ENCD1 to ENCD8 of linear scales 51 and 53 and rotary encoders 55 and 57 of all motors 31 to 38 (movement mechanisms) of movable section 30, at least one of the encoder signals ENCD1 to ENCD8, such as only the encoder signal ENCD1 that is correlated with Y-axis linear motor 31 (linear scale 51) which moves movable section 30 in the Y-axis direction, may be transmitted as the frame data FRMD. Then, working robot 10 can be configured to be capable of choosing whether the data of each device of movable section 30 is required to be transmitted by the multiplexing communication system in accordance with the flexibility of the cable connecting the fixed portions (amplifiers 22 to 25 of device main body 20) and the devices of movable section 30 to each other, the data transfer rate, and the like.

In the above-described embodiment, movable section 30 is provided with encoders transmitting data such as the positional information in a serial manner (serial transmission type) as linear scales 51 and 53 and rotary encoders 55 and 57. However, the present disclosure is not limited thereto, and movable section 30 may be provided with encoders transmitting respective pulses of A, B, and Z phases in another manner such as a parallel manner (parallel transmission type) or may be configured to be provided with multiple different types of encoders. FIG. 9 shows data of each bit position of the frame data FRMD pertaining to a case where the eight encoders of movable section 30 are parallel transmission-type rotary encoders without exception. In the following description, description regarding configurations similar to those illustrated in FIG. 4 (bit value setting) will be appropriately omitted.

In the frame data FRMD that is illustrated in FIG. 9, encoder signals ENCD1 to ENCD8 ("E1D to E8D" in the drawing) are bit-allocated at the respective bit positions 0 to 7 of clock 3. Data showing, for example, the pulse number (amount of rotation) of the A phase that is output as a result of rotation of a rotary shaft of the rotary encoder is set to each of E1D to E8D. In the frame data FRMD, in addition, data related to, for example, the direction of rotation of the rotary encoder ("E1N to E8N" in the drawing) is bit-allocated at each of the bit positions of clock 4. Regarding each of E1N to E8N, "0" is set to the bit value when, for example, the pulse signal of the B phase is at a LOW level during a rise in the pulse signal of the A phase and a clockwise (CW) rotation of the rotary encoder. In addition, regarding each of E1N to E8N, "1" is set to the bit value when, for example, the pulse signal of the B phase is at a High level during a rise in the pulse signal of the A phase and a counterclockwise (CCW) rotation of the rotary encoder. In the frame data FRMD, in addition, data of the signal level (High level or LOW level) of the pulse signal of the Z phase ("E1Z to E8Z" in the drawing) is bit-allocated at each bit position of clock 5. The pulse signal of the Z phase outputs, for example, a High-level pulse once at every rotation of the rotary encoder. In the frame data FRMD, in addition, information showing the presence or absence of the data of encoder signals ENCD1 to ENCD8 ("E1D to E8D" of clock 3) is bit-allocated at each bit position of clock 6. As described above, in this configuration, effects similar to those of the above-described embodiment can be achieved through a change in the configuration of the frame data FRMD in accordance with the type of the data of encoder signals ENCD1 to ENCD8 in encoders having a different type of transmission.

In addition, although working robot 10 carrying out the production operation has been described as an example in the above-described embodiment, the multiplexing communication system according to the present disclosure is not limited thereto, and may be applied to data transmission pertaining to, for example, an electronic component mounting apparatus which mounts an electronic component on a circuit board. In addition, the multiplexing communication system according to the present disclosure may be applied to a machine tool that performs cutting or the like.

Next, technical ideas that are derived from the content of the embodiment described above will be described.

(i) A multiplexing communication system according to any one of claims 1 to 6, in which the bit allocation means sets the bit correlated with the one with no input of the encoder signal among multiple bit-allocated bits as a non-processing object in a case where a bit width of the bit-allocated bit exceeds an input number of the encoder signal. In this configuration, the multiplex communication can be allowed to continue, without a change in the configuration of the multiplex data string, even in a case where the number of the encoders is reduced and the input number of the encoder signal is reduced due to a partial change or replacement of the multiplexing communication system.

(ii) The multiplexing communication system according to (i) described above, in which the movable section having the electromagnetic motor and the encoder is detachably connected, and in which the bit allocation means sets the bit correlated with the one with no input of the encoder signal as the non-processing object in a case where the input number of the encoder signal input from the encoder of the movable section connected to the multiplexing communication system is reduced. In this configuration, the multiplex communication can be allowed to continue, without a change in the configuration of the multiplex data string, even in a case where the input number of the encoder signal is reduced due to a decrease in the number of encoders attributable to a replacement of the detachable movable section or the like.

REFERENCE SIGNS LIST 29, 39: multiplex communication device, 10: working robot, 22 to 25: amplifier, 201: transmission data composition processing section, 211: FEC assignment section, 219: multiplexing section, 301: reception data demultiplexing processing section, 319: demultiplexing section, 601, 602: transmission and reception switching means, 605, 606: buffer section

The invention claimed is:
1. A multiplexing communication system comprising:
a multiplexing device that transmits a multiplex data string, the multiplex data string being a multiplexed encoder signal output from an encoder detecting the displacement of multiple electromagnetic motors; and
a bit allocating device that bit allocates the encoder signal and information related to the presence or absence of data of the encoder signal to each of bits bit-allocated in accordance with the encoder with respect to the multiplex data string of the transmission quantity of a pre-set timing among multiple of the bits included in the multiplex data string among multiple transmission quantities of the multiplex data string.

2. The multiplexing communication system according to claim 1, further comprising notifying device that notifies a drive control section controlling that drives the electromagnetic motor in accordance with the encoder signal of start timing of when the drive control section is started,
    wherein the notifying device notifies the drive control section of the start timing based on detection of at least one of a state where a communication line is established for the transmission of the multiplex data string by the multiplexing device and a state where a start delay time set as a delay time using the start of the multiplexing device as a starting point has elapsed.

3. The multiplexing communication system according to claim 2,
    wherein the encoder outputs the encoder signal by synchronous communication, and
    wherein the multiplexing communication system further comprises a buffer section that stores the encoder signal restored from the multiplex data string by a pre-set data amount on a reception side in accordance with the data transfer rate of the communication line and the data output interval time of the synchronous communication and then outputs the stored encoder signal to the drive control section by the synchronous communication.

4. The multiplexing communication system according to claim 2,
    wherein the drive control section and the encoder have different communication protocols, and
    the multiplexing communication system further comprises:
    a protocol conversion device that converts the encoder signal that the encoder outputs by using the type of the communication protocol of itself to the type of the communication protocol of the drive control section.

5. The multiplexing communication system according to claim 1,
    wherein the encoder outputs the encoder signal by half-duplex communication,
    wherein the multiplexing communication system further comprises a transmission and reception switching device configured to process switching of transmission and reception of the half-duplex communication, and
    wherein the transmission and reception switching device processes the switching by detecting an initiation of the transmission with a rise or fall in a leading bit of the data transmitted by the half-duplex communication and processes the switching by detecting a termination of the transmission with the quantity of detection of a pre-set end flag.

6. The multiplexing communication system according to claim 1,
    wherein the multiplexing device transmits the multiplex data string via at least one of communication media of an optical fiber cable, a LAN cable, and a USB cable.

7. A working robot carrying out an operation by holding a work with a movable section,
    wherein the working robot performs transmission of data related to the operation by using the multiplexing communication system according to claim 1.

8. The working robot according to claim 7,
    wherein the movable section includes the electromagnetic motor and the encoder, and
    wherein a drive control section is provided in a fixed portion so as to control driving of the electromagnetic motor by receiving the encoder signal output from the encoder and transmitted by the multiplexing communication system.

9. The working robot according to claim 8,
    wherein a power source supplied from the drive control section to the electromagnetic motor of the movable section is supplied by a power line disposed separately from a communication line through which the multiplexing device transmits the multiplex data string.

10. The working robot according to claim 8, further comprising:
    multiple movement mechanisms that move the movable section in multiple directions relative to the fixed portion and disposed corresponding to the respective multiple directions,
    wherein the multiplexing communication system transmits only data related to at least one of the multiple movement mechanisms.

* * * * *